(12) United States Patent  (10) Patent No.: US 12,518,126 B2
Sharma                      (45) Date of Patent: Jan. 6, 2026

(54) IDENTIFICATION DOCUMENT WITH ACTIVATABLE SECURITY FEATURE

(71) Applicant: Toppan Security SAS, Paris (FR)

(72) Inventor: Nipun Sharma, Suresnes (FR)

(73) Assignee: Toppan Security SAS, Paris (FR)

( * ) Notice: Subject to any disclaimer, the term of this patent is extended or adjusted under 35 U.S.C. 154(b) by 0 days.

(21) Appl. No.: 18/775,156

(22) Filed: Jul. 17, 2024

(65) Prior Publication Data

US 2025/0036910 A1  Jan. 30, 2025

(30) Foreign Application Priority Data

Jul. 24, 2023 (EP) .................................... 23315291

(51) Int. Cl.
*G06K 19/077* (2006.01)
*B42D 25/23* (2014.01)
*H01Q 1/22* (2006.01)

(52) U.S. Cl.
CPC ..... *G06K 19/07773* (2013.01); *H01Q 1/2225* (2013.01); *B42D 25/23* (2014.10)

(58) Field of Classification Search
None
See application file for complete search history.

(56) References Cited

U.S. PATENT DOCUMENTS

2008/0061149 A1\* 3/2008 Tanner ............ G06K 19/07345
                                                235/492
2015/0097039 A1  4/2015 Narendra et al.
2015/0317896 A1  11/2015 Planton et al.
2019/0279063 A1\* 9/2019 Miettinen .......... G06K 19/0728
2019/0303736 A1\* 10/2019 Sismundo ................ H04B 5/26
2020/0266542 A1\* 8/2020 Mu ........................ H01Q 1/368

FOREIGN PATENT DOCUMENTS

CN    102663472       9/2012
DE    102007009213    8/2008
DE    102009005100    7/2010

OTHER PUBLICATIONS

"European Application Serial No. 23315291.7, Extended European Search Report mailed Jan. 26, 2024", 7 pgs.

\* cited by examiner

*Primary Examiner* — Kristy A Haupt
(74) *Attorney, Agent, or Firm* — Schwegman Lundberg & Woessner, P.A.

(57) ABSTRACT

An identification document has an activatable security feature, the activatable security feature has a first antenna part and a second antenna part arranged such that a gap is formed between them. The security feature further has a patch connected to the first antenna part and the second antenna part such that it bridges the gap, the patch being formed of a material having conductive properties which are changeable from low-conductive to high-conductive such that a conductive path is provided between the first antenna part and the second antenna part after energy has been applied to the patch, such as by laser irradiation. The security feature further has an electrical device such as an RFID chip connected to the first antenna part and/or the second antenna part.

20 Claims, 6 Drawing Sheets

FIG 8
I.
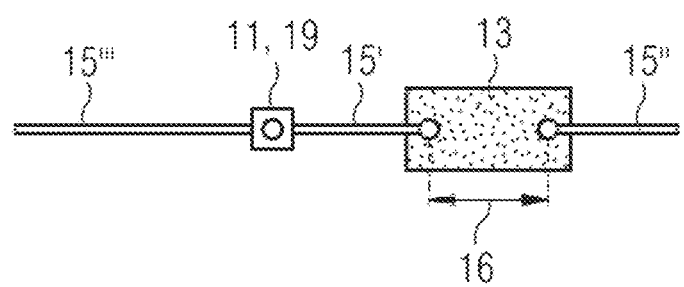
II.
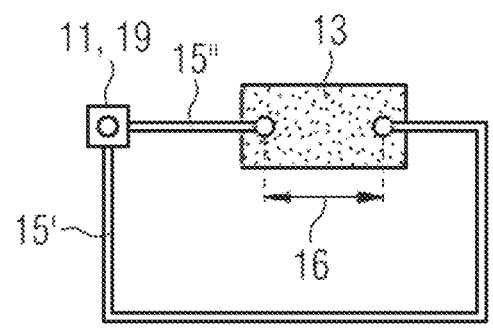
III.
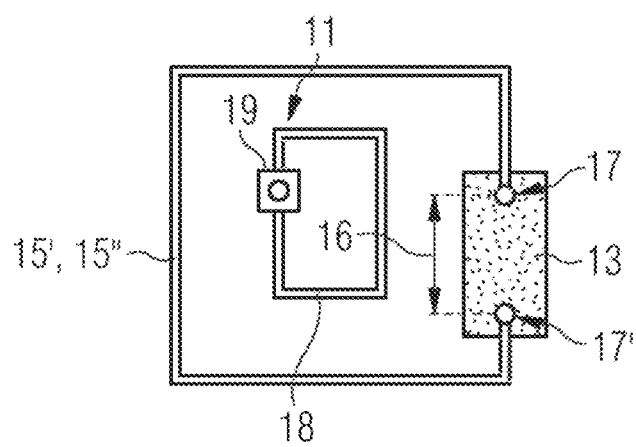

IDENTIFICATION DOCUMENT WITH ACTIVATABLE SECURITY FEATURE

CROSS-REFERENCE TO RELATED APPLICATION(S)

This application claims priority to European Patent Appl. No. 23315291.7, titled "Identification Document with Activatable Security Feature," filed Jul. 24, 2023, which is incorporated herein by reference in its entirety.

TECHNICAL FIELD

The present disclosure generally relates to security features for identification documents. In particular, the present disclosure relates to an activatable security feature of an identification document.

BACKGROUND

The use of identification documents is pervasive. Identification documents are used for example to prove identity or to verify age. An example of an identification document is an identity card. An identity card is an official governmental document that certifies the personal identity of its holder.

Identification documents are provided with indicia of identification (identification features) of the document holder such as the full name, the photograph, the date of birth or the signature of the document holder.

Further, identification documents are provided with security features such as laser engraving/personalization, holograms or security printing, among others. Security features are directed to verifying the authenticity of the identification document. For example, an RFID chip module which allows the identification information stored on the RFID chip to be read following authentication, may be considered as a security feature. Such an RFID chip module and the associated chip readers may be integrated with high security mechanisms in order to prevent any forceful skimming of data it contains. Thus, the RFID chip module is part of the authentication process of the identification document.

The present disclosure is directed, at least in part, to improving or overcoming one or more aspects of prior systems.

SUMMARY OF THE DISCLOSURE

According to a first aspect of the present disclosure, an identification document has an activatable security feature. The activatable security feature has a first antenna part, a second antenna part, a patch and an electrical device. The first antenna part and the second antenna part are arranged such that a gap is formed between them. The patch is connected to the first antenna part and the second antenna part such that it bridges the gap. The patch is formed of a material having conductive properties which are changeable from low-conductive to high-conductive such that a conductive path is provided between the first antenna part and the second antenna part after energy such as, for example, laser irradiation has been applied to the patch. The electrical device such as an RFID chip is connected to the first antenna part and/or the second antenna part.

In a second aspect of the present disclosure, a method of manufacturing an identification document having an activatable security feature is disclosed. The method includes providing a first antenna part and a second antenna part, arranging the first antenna part and the second antenna part such that a gap is formed between them, providing a patch and connecting the patch to the first antenna part and the second antenna part such that it bridges the gap. The patch is formed of a material having conductive properties which are changeable from low-conductive to high-conductive such that a conductive path is provided between the first antenna part and the second antenna part after energy such as, for example, laser irradiation has been applied to the patch, respectively to the material of the patch. The method further includes providing an electrical device such as an RFID chip and connecting the electrical device to the first antenna part and/or the second antenna part.

Other features and aspects of the present disclosure will be apparent from the following description and the accompanying drawings.

BRIEF DESCRIPTION OF THE DRAWINGS

FIG. 8 shows different options to arrange the first antenna part and the second antenna part and to connect them to the electrical device 11.

DETAILED DESCRIPTION

Figure 1:
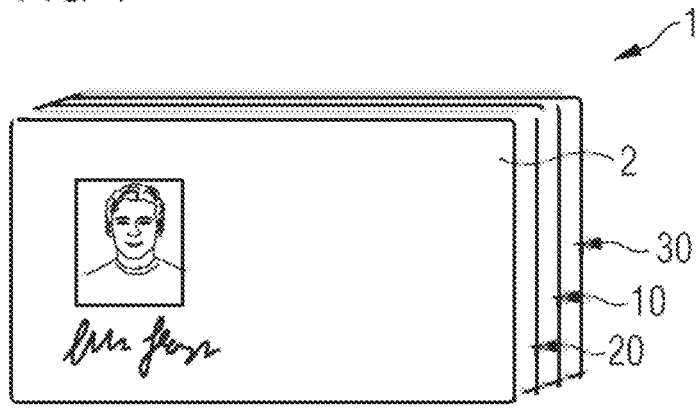
FIG. 1 shows an identification document 1 having an activated security feature according to a first exemplary embodiment in perspective top view.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that the security of an identification document can be increased by using a material that is able to change its conductive properties from low-conductive to high-conductive and by integrating this material as part of a security feature into the identification document. The material changes its conductive properties after energy has been applied to it. The energy, for example, may be applied to the material in form of laser irradiation. Alternatively, the energy may be applied by any method (device) capable of generating heat such as welding, chemical heating processes, etc., A patch (section, portion) of this material is integrated in a security feature of the identification document such that dependent on the conductivity of the material of the patch (which is changeable from low-conductive to high-conductive by applying energy such as laser irradiation), the security feature of the identification document is functional or non-functional. The patch may, for example, be coated to a layer of the identification document. The coating may be attached to the layer by means of screen-printing, inkjet, slot dye or any conventional, well-known method used in the coating industry.

The security feature that the patch is part of, has a first antenna part, a second antenna part, the patch and an electrical device to which the first antenna part and/or second antenna part is connected. The first antenna part and the second antenna part are arranged such that between them there is a gap. In other words, the first antenna part and the second antenna part do not form a continuous path through which current can flow. The gap corresponds to a section positioned between the first antenna part and the second antenna part with low conductivity compared to the conductivity of the first antenna part and the second antenna part. The patch is connected to the first antenna part and the second antenna part such that it bridges (closes) the gap between the first antenna part and the second antenna part. When the material of the patch has high-conductive properties, the patch provides a conductive bridge through which electricity can flow from the first antenna part to the second antenna part. When the material of the patch has low-conductive properties, the patch provides a bridge which prevents electricity from flowing from the first antenna part to the second antenna part or which allows only a limited amount of electricity to flow from the first antenna part to the second antenna part.

Before energy has been applied to the patch, the patch is low-conductive such that the antenna doesn't work. "Before energy has been applied to the patch" may for example mean "before the patch has been laser irradiated". When the patch is low-conductive, current cannot pass the gap or, more specifically, only an insufficient amount of electricity can pass the gap such that the security feature is not functional.

After energy has been applied to the patch, the patch is high-conductive. "After energy has been applied to the patch" may for example mean "after the patch has been laser irradiated". When the patch is high-conductive, current can pass the gap or, more specifically, a sufficient amount of current can pass the gap such that the security feature is functional.

The term "low-conductive" in the present disclosure does not mean that the conductivity of the respective material must be equal or close to 0 S/m (it however can be equal or close to 0 S/m). Rather, it means that the current which can flow via the patch from the first antenna part to the second antenna part is too low to enable the electrical device to function. The term "high conductive" on the other hand means that the current which can flow via the patch from the first antenna part to the second antenna part is high enough to enable the electrical device to function. Consequently, the threshold value for the conductivity of the patch from which the same is considered to be high-conductive depend on the respective configuration of the security feature, i.e., the type of the electrical device and the type of antenna.

To give an example: for a configuration having an RFID chip of type HF 13.56 MHz chips/modules configured to communicate with an RFID reader and an antenna of type copper ($\sigma=5.96\times10^7$ S/m) or silver ($\sigma=6.30\times10^7$ S/m), it is found that in a communication distance within a range of 0-40 mm, the RFID reader (transponder) must operate in a field strength of 1.5 A/m-7.5 A/m. The transponder will start to communicate at 0.8 A/m. Consequently, according to the present disclosure, a conductivity of the patch up to around $3\text{-}4\times10^7$ S/m is considered to be low-conductive. Accordingly, when the conductivity of the patch is higher than the about $3\text{-}4\times10^7$ S/m (10 to 20 $\Omega$/sq), the RFID chip is enabled to communicate with the RFID reader and the patch is considered to be high-conductive.

For measuring the conductivity of the patch the four-probe method (4 point probe measurement method) may be used which is a well known measuring method in the industry. For example, for use in making the four point probe measurements, the RM3000 Test Unit of the company MDC Materials Development Corp. SA as available at the time of filing of the present application may be used.

Every material that changes its conductive properties after energy such as laser irradiation has been applied to it may in principal be used for the patch. The patch may for example comprise silver (Ag) or copper (Cu) nanowires. The conductive Nano Copper Inks (such as products LF-300 Paper, LF-301 Paper, LF-350 PET, LF-360 PET Low-temp, LF-370 FR4, LF-371 Thick print, LF-390 PI, and LF-380 HJT PV) from company Copprint Technologies Ltd. are given as an example for a material that changes its conductivity when exposed to laser irradiation (heat) from low-conductive to high-conductive and from which the patch may be made off (cf. latest technical data sheets at the date of filing of the present disclosure).

To make the security feature functional, it is not necessary that the complete patch is high-conductive but only that a conductive path within the patch connects the first antenna part with the second antenna part. To make the security feature functional, for example, the patch may be irradiated with a specific laser irradiation. In this disclosure, the process of making the security feature functional is also referred to as activating the security feature. A security feature which has not been activated yet is also referred to as an activatable security feature.

A specific amount of energy must be transferred to the patch for changing the conductive properties of the patch from low-conductive to high-conductive. If the energy is applied to the patch by means of laser irradiation, specific laser irradiation parameters have to be used. The specific laser irradiation parameters depend on the material of the patch. Not using the specific laser irradiation parameters will not make the security feature functional and may affect/destroy other features provided on the identification document. If a forger were to attempt to activate the security feature of the identification document, the forger would not possess the knowledge required for successfully providing a conductive path in the patch by means of laser irradiation. To the contrary, the forger may set the laser power too high and destroy one or more of the additional identification features or security features provided on the identification document.

As an example, the specific parameters of a laser irradiation which need to be applied to change the conductivity of a patch made of copper or silver nanowires from low-conductive to high-conductive may have a laser wavelength in the range of 515-1030 nm (visible to infrared), a laser speed in the range of 2 mm/s-4000 mm/s, and a laser power in the range of 10 mJ/cm$^2$-6000 mJ/cm$^2$.

The conductive path is not randomly arranged in the identification document but is arranged such that it contacts both the first antenna part and the second antenna part to successfully establish a conductive bridge between the first antenna part and the second antenna part. Preferably, the conductive path is connected to an end portion of the first antenna part and to an end portion of the second antenna part. The first and second antenna parts may be provided on a layer of an identification document having multiple layers laminated together. The first and second antenna parts may not be visible as they are covered by other layers of the identification document. If a forger were to attempt to activate the identification document by providing a conductive path between the first and second antenna part, the forger would not be able to do so without knowing where to start and where to end the conductive path. As only the manufacturer of the identification document has the knowledge of the specific laser parameters to change the conductivity of the patch and of where to start and to end the conductive path, forgers are prevented from activating the security feature of the identification document. Thus, the security of the identification document is increased.

The first antenna part and/or the second antenna part are connected to the electrical device. The first antenna part and/or the second antenna part may be either electrically or inductively connected to the electrical device. In the following, three exemplary configurations in which the first antenna part and/or the second antenna part are differently (electrically or inductively) connected to the electrical device are given.

In a first exemplary configuration as shown in FIG. 8 I, only one of the first antenna part and the second antenna part, between which the gap is formed, is electrically connected to an RFID chip (electrical device).

In a second exemplary configuration as shown in FIG. 8 II, the first antenna part and the second antenna part, between which the gap is formed, are electrically connected to an RFID chip (electrical device). In that case, the RFID chip, the first antenna part, the second antenna part and the conductive path (after energy has been applied to the patch) together form a closed circuit.

In a third exemplary configuration as shown in FIG. 8 III, the first antenna part and the second antenna part, between which the gap is formed, are integrally formed and the gap is formed between two antenna ends of the integrally formed first and second antenna parts. In the third configuration, the integrally formed first and second antenna parts are not electrically but inductively connected (inductively coupled) to the electrical device which comprises a coupling antenna and an RFID chip to which the coupling antenna is connected. A use case of the third configuration is, for example, a booster antenna which includes the integrally formed first and second antenna parts and which is inductively connected (inductively coupled) to the coupling antenna, the coupling antenna being a component of the electrical device of the identification document.

According to an exemplary embodiment, the gap between the first antenna part and the second antenna part may for example has a width in the range of 1-6 cm, preferably in the range of 2-3 cm.

An identification document may have multiple layers laminated to each other. According to an exemplary embodiment, the electrical device, the first antenna part, the second antenna part and the patch are provided on a first layer of the identification document. The first layer may be one of multiple layers of an identification document, the first layer being sandwiched by others of the multiple layers and thus protecting the electrical device, the first antenna part, the second antenna part and the patch from damage due to external (environmental) influences and fraudsters.

According to a further exemplary embodiment, the identification document has a second layer arranged on top of the first layer. The second layer includes a transparent window overlapping at least partly the patch. The patch is configured to form a desired pattern after energy such as, for example, laser irradiation has been selectively applied to the material of the patch. The pattern is visible through the transparent and at least partly forms the conductive path.

This embodiment further increases the security of an identification document. The patch in this instance has a material which is not only able to change its conductive properties from low-conductive to high-conductive but is also able to form a pattern (personalized credentials) after energy has been applied to the material. The energy applied may for example be laser irradiation and the material of the patch may for example be laser-engravable. Before being irradiated with a specific laser irradiation, the patch is not engraved. After selectively being irradiated with a specific laser irradiation, the patch is engraved with a desired pattern such as, for example, a signature or the like. The patch may for example comprise silver (Ag) or copper (Cu) nanowires. The previous mentioned conductive Nano Copper Inks from company Copprint Technologies Ltd. are examples of a laser engravable material which changes its conductive properties from low-conductive to high-conductive after being irradiated.

The pattern may have personal information such as a date of birth or a signature. Thus, the pattern is personalizable and together with the transparent window, through which pattern is visible, forms an identification feature of the identification document. The transparent window is arranged above the patch in stacking direction of the first layer and the second layer such that the transparent window overlaps the patch. The security of the identification document is further increased by applying energy such as a specific laser irradiation to the patch. This not only activates the security feature but also adds personal information of the holder to the identity card. Thus, the security feature also functions as an identification personalized feature.

The transparent window is a section of the second layer through which the pattern is visible. The window may for example be transparent for visible light. In an exemplary embodiment the window may be transparent to other spectrums of light, such as for example ultra-violet lights.

According to a preferred embodiment, the security feature is activated and engraved (personalized) by laser irradiating the patch. The laser irradiation used for laser engraving the patch and the laser irradiation used for activating the security feature, i.e., changing the conductive properties of the patch, are the same. In other words, the changing of the conductive properties of the patch and the laser-engraving of the patch are performed simultaneously with the same laser irradiation.

According to another exemplary embodiment, the identification document includes multiple antenna parts arranged such that a gap is formed between each two of them. Further, the identification document has multiple patches each of which closing a gap. The multiple patches may be made of the same material or different materials. The required energy to activate the security feature and, if the patch is engravable, to engrave (personalize) the patch, depends on the type of material of the respective patch.

Thus, in case of using laser irradiation as energy source, the specific parameters of the laser irradiation to change the conductivity of the patch and to laser engrave the patch may vary in the different patches according to the manufacturer's choice. This adds another level of security, as the specific parameters for the laser irradiation to be applied is exclusive knowledge of the manufacturer of the identity card. By increasing the number of (different) patches, the extent of data required to successfully turn the security feature functional and to further personalize the identity card increases. This makes forgery even more difficult. The identification document may for example have a first antenna part, a second antenna part and a third antenna part. There is a first gap between the first antenna part and the second antenna part. There is a second gap between the second antenna part and the third antenna part. To bridge the first gap, a first patch is provided on a first layer of the identification document. To bridge the second gap, a second patch is provided on the first layer of the identification document. The first patch and the second patch may be made of different material requiring different energy input to change their conductive properties from low-conductive to high-conductive and to provide a conductive path between the respective antenna parts. Accordingly, the parameters for the laser irradiation to change the conductive properties of the first and second patch are different. Further, the first patch and the second patch may be laser-engravable and transparent windows may be provided in a second layer, the second layer being arranged above the first layer such that the first pattern and second pattern are visible though the transparent windows. As the material of the first patch and second patch is different, the parameters for the laser irradiation to laser engrave the first patch and the second patch are different.

In an exemplary embodiment, the conductive path has a length in the range of 1-9 cm, preferably in the range of 2-5 cm. By adjusting the length of the conductive path, the length to the antenna and thus the antenna characteristics may be amended.

FIG. 1 shows an identification document 1 having an activated security feature according to a first exemplary embodiment of the present disclosure in perspective top view. The identification document 1 includes a substrate 2. The substrate 2 in FIG. 1 is formed by a first layer 10, a second layer 20, and a third layer 30, stacked on each other. The layers 10, 20, 30 are made of polycarbonate (PC) or Polyvinyl chloride (PVC), and in some cases bamboo etc. The activatable security feature may also be used in a datapage (in passports) where a datapage can be formed using polycarbonate (PC) along with a layer of TPU (Thermoplastic polyurethane). The layers 10, 20, 30 are connected to each other by lamination processes or the like, known by the skilled person. The second layer 20 has identification features, such as a photograph and the name of the holder. Of course, other identification features or security features known by the skilled person may be provided in the identification document 1.

Figure 2:
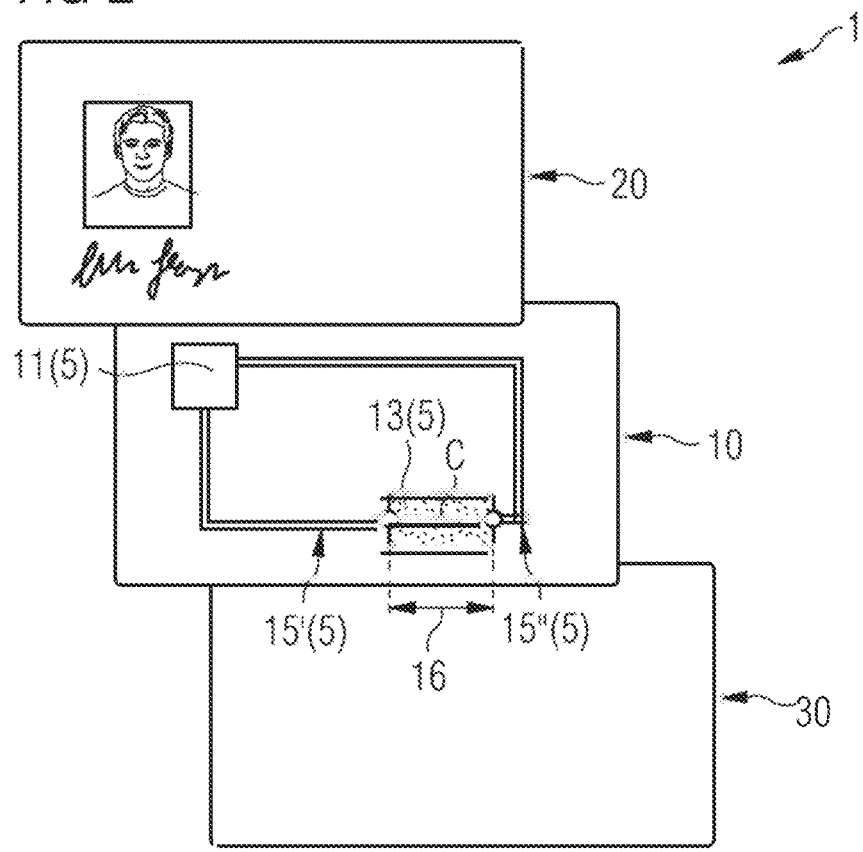
FIG. 2 is an exploded view of the identification document 1 of FIG. 1 having an activated security feature.

FIG. 2 is an exploded view on the identification document 1 of FIG. 1 having an activated security feature 5. The activated security feature 5 has an RFID chip 11, a first antenna part 15', a second antenna part 15" and a patch 13. The RFID chip 11, the first antenna part 15', the second antenna part 15" and the patch 13 are provided on layer 10. There is a gap 16 between the first antenna part 15' and the second antenna part 15". The patch 13 is positioned on the first layer 10 such that it touches the first antenna part 15' and the second antenna part 15" and fills the gap 16. A conductive path C within the patch 13 conductively connects the first antenna part 15' and the second antenna part 15". In an assembled (laminated) state, the second layer 20 is positioned on top of the first layer 10. In the assembled state, the RFID chip 11, the first antenna part 15' and the second antenna part 15" are covered by the second layer 20 such that they are sandwiched between the first layer 10 and the second layer 20. In FIG. 2, the security feature 5 is activated. The security feature 5 includes the RFID chip 11, the first antenna part 15', the second antenna part 15" and the patch 13.

Figure 3:
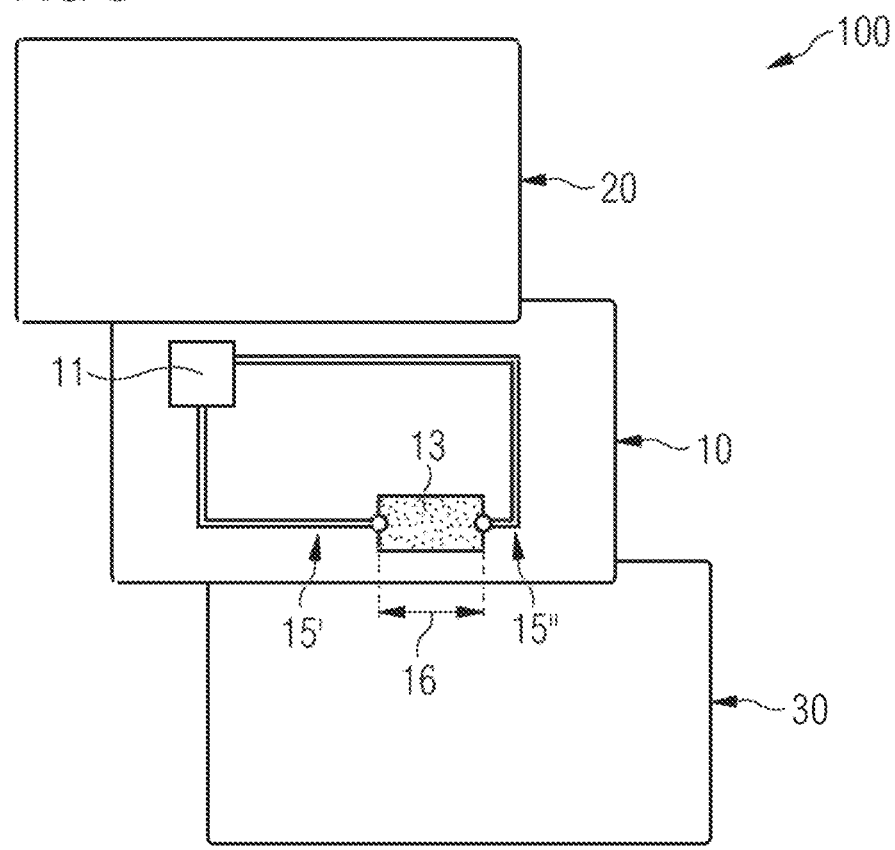
FIG. 3 is an exploded view of the identification document 1 of FIG. 1, however the identification document 100 in FIG. 3 is shown in a state in which the security feature is not yet activated and the identity card is not yet personalized.

FIG. 3 is an exploded view of the identification document 1 of FIG. 1, however the identification document 100 in FIG. 3 is shown in a state in which the security feature is not yet activated and the identification card is not yet personalized. Not being personalized means that the picture and the name of the holder (i.e., the identification features) are not yet provided on the document. Not yet activated further means that the patch 13 does not yet have a conductive path C between the first antenna part 15' and the second antenna part 15".

Figure 4:
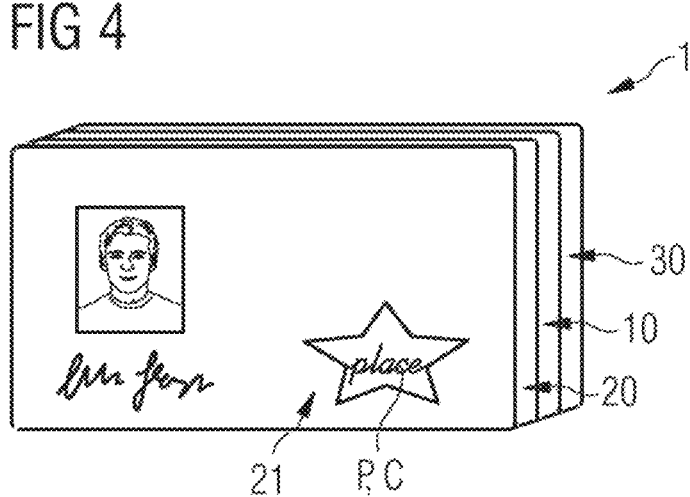
FIG. 4 shows an identification document 1 having an activated security feature according to a second exemplary embodiment in perspective top view.

FIG. 4 shows an identification document having an activated security feature according to a second exemplary embodiment of the present disclosure in perspective top view. The identification document is shown in a laminated state. The identification document 1 shown in FIG. 4 to a large extent corresponds to the identification document 1 shown in FIG. 1. However, the second layer 20 in FIG. 4 has a transparent window 21. The transparent window 21 has a star shaped form. Further, the patch comprises a pattern P which is visible through the transparent window 21. The pattern P corresponds at least partly to the conductive path C. For illustrative purpose only, the pattern P shows the term "place". The pattern P, by way of example, may correspond to the date of birth, the place of birth or the signature of the card holder.

Figure 5:
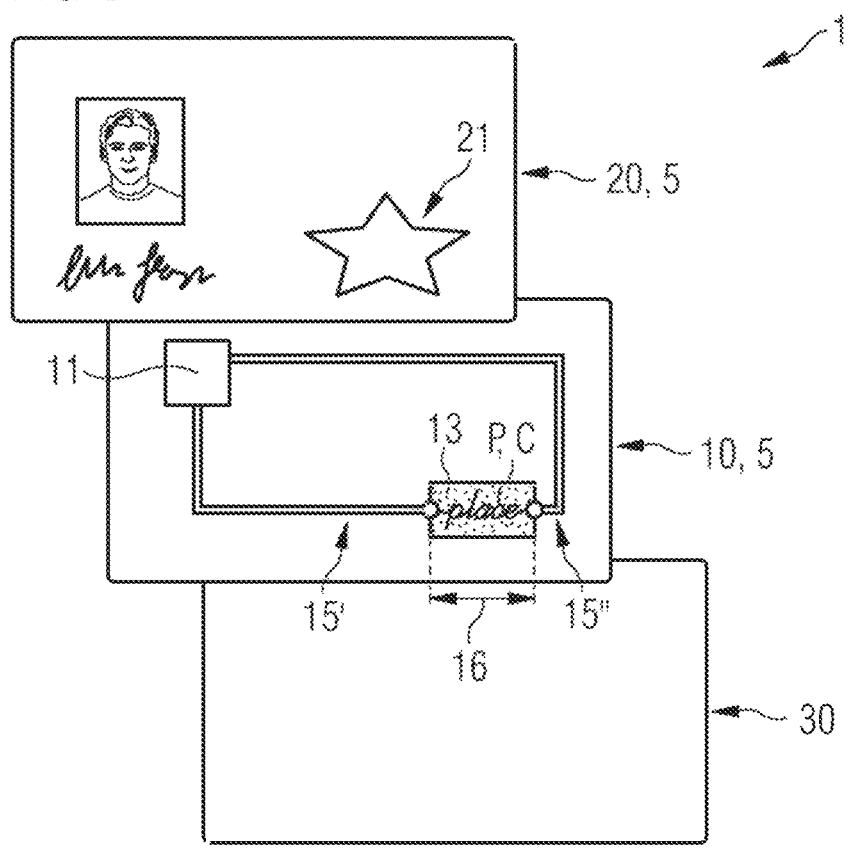
FIG. 5 is an exploded view of the identification document 1 of FIG. 4 having an activated security feature.

FIG. 5 is an exploded view of the identification document of FIG. 4 having an activated security feature. The first layer 10 has an RFID chip 11, a first antenna part 15', a second antenna part 15" and a patch 13. The patch 13 is positioned on the first layer 10 such that it touches the first antenna part 15' and the second antenna end part 15". A conductive path C within the patch 13 conductively connects the first antenna part 15' with the second antenna part 15". The conductive path C forms the pattern P. The conductive path C respectively the pattern P forms the term "place". In assembled state, the second layer 20 is positioned on top of the first layer 10, wherein the transparent window is positioned above the patch 13 such that the pattern P is visible through the transparent window 21. In other embodiments, the transparent window may be a semi-transparent window and in some cases a non-transparent window.

Figure 6:
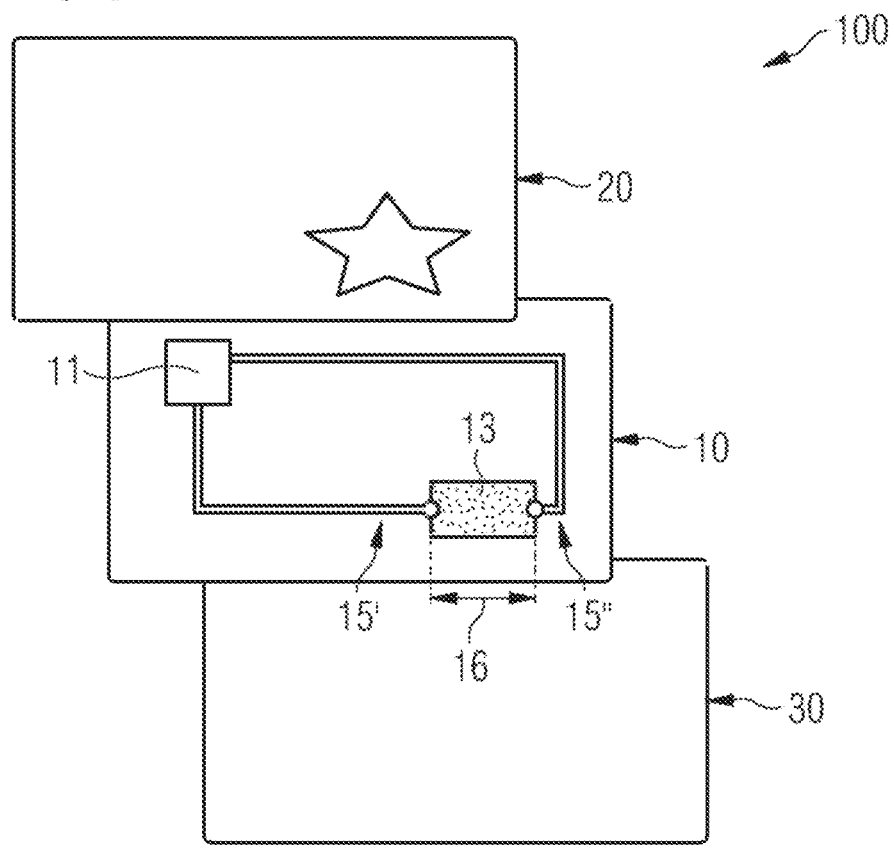
FIG. 6 is an exploded view of the identification document 1 of FIG. 4, however the identification document 100 in FIG. 6 is shown in a state in which the security feature is not yet activated and the identity card is not yet personalized.

FIG. 6 is an exploded view of the identification document 1 of FIG. 4, however the identification document 100 in FIG. 6 is shown in a state in which the identification feature is not yet personalized and the security feature is not yet activated. In FIG. 6, the patch 13 does not have a conductive path such that the interrupted section of the antenna 12 is not conductively closed and the security feature is not activated. The second layer 20 only has the star-shaped transparent window.

Figure 7:
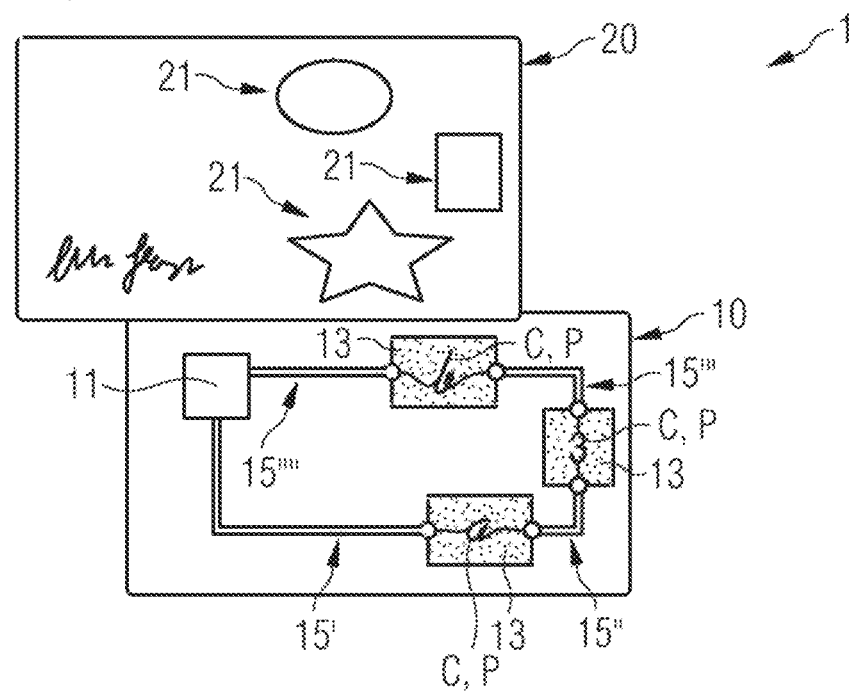
FIG. 7 is an exploded view of an identification document 1 having an activated security feature according to a third exemplary embodiment.

FIG. 7 is an exploded view of an identification document 1 having an activated security feature according to a third exemplary embodiment. The identification document has a first layer 10 and a second layer 20. The second layer 20 has a signature of the card holder as an exemplary identification feature. Further, the second layer has three transparent windows 21, one of which is star-shaped, one of which is rectangular-shaped and one of which is oval-shaped. The first layer 10 has an RFID chip 11, a first antenna part 15', a second antenna part 15", a third antenna part 15''' and a fourth antenna part 15''''. The first layer 10 further has three patches 13. Each patch 13 is connected to two antenna parts. Specifically, a first patch 13 is connected to the first antenna part 15' and the second antenna part 15", a second patch 13 is connected to the second antenna part 15" and the third antenna part 15''', and a third patch 13 is connected to the third antenna part 15''' and the fourth antenna part 15''''. The first antenna part 15' and the second antenna part 15" are connected by a conductive path C formed in the first patch 13. The conductive path C forms the letter "a" which corresponds to the pattern P visible through the star-shaped transparent window 21 formed in the second layer. The second antenna part 15" and the third antenna part 15''' are connected by a conductive path C formed in the second patch 13. The conductive path C forms the number "3" which corresponds to the pattern P visible through the rectangular-shaped transparent window 21 formed in the second layer. The third antenna part 15''' and the fourth antenna part 15'''' are connected by a conductive path C formed in the third patch 13. The conductive path C forms the letter "b" which corresponds to the pattern P visible through the oval-shaped transparent window 21 formed in the second layer. The shown patterns are for illustrative purposes only and may for example be a signature, a date of birth or a place of birth of the card holder.

FIG. 8 shows different options to arrange the first and second antenna parts (such as separate or integral formation of the first and second antenna parts) and to connect the antenna to the electrical device 11 (such as electrically or inductively connection).

In FIG. 8 I, the antenna has three separate antenna parts 15', 15" and 15'''. The gap 16 is formed between the first antenna part 15' and the second antenna part 15". The first antenna part 15' and the third antenna part 15''' are electrically connected to the electrical device 11. The second antenna part 15" is not electrically connected to the electrical device.

In FIG. 8 II, the antenna has two separate antenna parts 15', 15". The gap 16 is formed between the first antenna part 15' and the second antenna part 15". The first antenna part 15' and the second antenna part 15" are electrically connected to the electrical device 11.

In FIG. 8 III, the first antenna part 15' and the second antenna part 15" are integrally formed. The electrical device 11 has an RFID chip and a coupling antenna electrically connected to the RFID chip. The integrally formed antenna parts 15', 15" are inductively connected (inductively coupled) to the coupling antenna of the electrical device 11.

INDUSTRIAL APPLICABILITY

With reference to FIG. 2 and FIG. 3, the method of manufacturing an identification document 100 having an activatable security feature 5 according to a first exemplary embodiment is explained.

FIG. 3 shows an identification document 100 in an exploded view. The identification document 100 in FIG. 3 is shown in a state in which the security feature is not yet activated. The method of manufacturing the identification document 100 as shown in FIG. 3 includes providing a first antenna part 15' and a second antenna part 15" and arranging the first antenna part 15' and the second antenna part 15" such that a gap 16 is positioned between them. Further, the method includes providing a patch 13 and connecting the patch 13 to the first antenna part 15' and the second antenna part 15". The patch 13 has a material having conductive properties which are changeable from non-conductive to high-conductive such that a conductive path C is provided between the first antenna part 15' and the second antenna part 15" after energy such as, for example, laser irradiation has been applied to the material. Further, the method includes the step of providing an electrical device 11 such as an RFID chip and connecting the electrical device 11 to the first antenna part 15' and/or the second antenna part 15". In FIG. 3, the electrical device 11 is connected to both, the first antenna part 15' and the second antenna part 15".

In a next step, the (not yet activated) security feature of the identification document 100 is activated. The security feature is activated by applying energy such as laser irradiation to at least parts of the material of the patch 13 such that the conductivity of the material changes from non-conductive to high-conductive and a conductive path C between the first antenna part 15' and the second antenna part 15" is formed. To form the conductive path C in the patch 13, the specific parameters of the energy (e.g., laser irradiation) to be applied must be known. Further, the position of the first and second antenna part 15', 15" must be known. This information usually is limited to a small number of parties such as the manufacturer of the identification document and national identity card authorities issuing the identification cards. FIG. 2 shows the identification document of FIG. 3 in a state in which the security feature is activated. As can be seen in FIG. 2, the gap 16 is conductively bridged by a linear conductive path C such that the security feature is functional. In the embodiment shown in FIG. 2, the patch 13 is covered by the second layer 20 and therefore not visible. The national identity card authorities may provide further security features and identification features on the identification document. As an example, a photo and a signature is shown on the second layer 20.

With reference to FIG. 5 and FIG. 6, the method of manufacturing an identification document 100 having an activated security feature 5 according to a second exemplary embodiment is explained.

FIG. 6 shows an identification document 100 in a state in which the security feature is not yet activated. The method of manufacturing the identification document 100 as shown in FIG. 6 corresponds to the method described for FIG. 3. However, the method further includes the steps of providing the patch on a first layer 10 of the identification document, providing a second layer 20 of the identification document 1 which has a transparent window 21, and arranging the second layer 20 on top of the first layer such that the transparent window 21 overlaps at least partly the patch 13. FIG. 6 has a star-shaped transparent window 21.

Now referring to FIG. 5, the identification document of FIG. 6 is shown, however the security feature 5 is now activated after having applied energy to the patch 13 (e.g., irradiating the patch) such that the conductivity of the patch 13 at least partly changes and forms a conductive path C between the first antenna part 15' and the second antenna part 15". The energy in this case is selectively applied to the material to simultaneously form a conductive path C and a desired pattern P in the patch 13. The pattern P is visible through the transparent window 21. As can be seen in FIG. 5, the desired pattern P is used to form the conductive path C or in other words, the conductive path C is used to form a desired pattern P.

The conductive path forms a pattern in the patch, for example a laser-engraved pattern. The pattern represents data such as personal data of the document holder. In FIG. 5 the pattern "place" is for illustrative purpose only and may correspond to any personal information of the card holder. The same energy such as laser irradiation may be used for personalizing (engraving) the patch 13 and for activating the security feature by changing the conductivity of the patch 13. Such activation of the security feature and the personalization of the patch may for example be performed by national identity card authorities. However, such personalization and activation may only be performed if the national identity card authority knows the specific parameters of the laser irradiation to be used.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

LIST OF REFERENCES 1 identification document wherein the activatable security feature is activated
5 security feature
10 first layer
11 electrical device
13 patch
15' first antenna part
15" second antenna part
15''' third antenna part
15'''' fourth antenna part
16 gap
17, 17' antenna ends
18 coupling antenna
19 RFID chip
20 second layer
21 transparent window
30 third layer
100 identification document wherein the activatable security feature is not yet activated
C conductive path
P pattern

The invention claimed is:

1. An identification document comprising an activatable security feature, the activatable security feature comprising:
   a first antenna part and a second antenna part arranged such that a gap is formed between them;
   a patch connected to the first antenna part and the second antenna part such that it bridges the gap, the patch being formed of a material having conductive properties which are irreversibly changeable from low-conductive to high-conductive enabling a conductive path to be provided between the first antenna part and the second antenna part after energy has been applied to the patch; and
   an electrical device connected to at least one of the first antenna part or the second antenna part.

2. The identification document of claim 1, wherein the energy is laser irradiation.

3. The identification document of claim 1, wherein the electrical device is an RFID chip.

4. The identification document of claim 1, wherein the first antenna part and the second antenna part are electrically connected to the electrical device such that the electrical device, the first antenna part, the second antenna part, and the conductive path together form a closed circuit.

5. The identification document of claim 1, wherein the first antenna part and the second antenna part are integrally formed and two antenna ends form the gap, and the electrical device comprises a coupling antenna which is inductively connected to the integrally formed first and second antenna parts.

6. The identification document of claim 1, wherein the material of the patch comprises at least one of silver nanowires or copper nanowires.

7. The identification document of claim 1, wherein the electrical device, the first antenna part, the second antenna part, and the patch are provided on a first layer of the identification document.

8. The identification document of claim 7, further comprising a second layer arranged on top of the first layer, wherein:
   the second layer comprises a transparent window at least partly overlapping the patch; and
   the patch is configured to comprise a desired pattern after energy has been selectively applied to the material, the pattern being visible through the transparent window and at least partly forming the conductive path.

9. The identification document of claim 1, comprising:
   a plurality of antenna parts serially arranged with a gap formed between each two serially adjacent antenna parts; and
   a plurality of patches, each patch bridging a respective gap.

10. The identification document of claim 8, comprising:
    a plurality of antenna parts serially arranged with a gap formed between each two serially adjacent antenna parts; and
    a plurality of patches, each patch bridging a respective gap.

11. The identification document of claim 10, wherein the second layer comprises a plurality of transparent windows, each transparent window at least partly overlapping a respective one of the plurality of patches.

12. The identification document of claim 9, wherein the plurality of patches are not each made of the same material.

13. The identification document of claim 1, wherein the conductive properties of at least a portion of the material of the patch have changed from low-conductive to high-conductive after energy has been applied to the material, and the patch provides the conductive path between the first antenna part and the second antenna part.

14. The identification document of claim 13, wherein the material of the patch comprises a desired pattern after the energy has been applied to the material, and the desired pattern at least partly forms the conductive path.

15. A method of manufacturing an identification document comprising an activatable security feature, the method comprising the steps of:
    arranging a first antenna part and a second antenna part such that a gap is formed between them;
    connecting a patch to the first antenna part and the second antenna part such that it bridges the gap, the patch comprising a material having conductive properties which are irreversibly changeable from low-conductive to high-conductive enabling a conductive path to be provided between the first antenna part and the second antenna part after energy has been applied to the patch; and
    connecting an electrical device to at least one of the first antenna part or the second antenna part.

16. The method of manufacturing an identification document of claim 15, further comprising:
    providing the patch on a first layer of the identification document;

providing a second layer of the identification document that comprises a transparent window; and arranging the second layer on top of the first layer such that the transparent window at least partly overlaps the patch.

17. The method of manufacturing an identification document of claim 15, further comprising applying energy to at least part of the material such that the conductive properties of at least a portion of the material changes from low-conductive to high-conductive and the conductive path between the first antenna part and the second antenna part is formed.

18. The method of manufacturing an identification document of claim 16, further comprising applying energy to at least part of the material such that the conductive properties of at least a portion of the material changes from low-conductive to high-conductive and the conductive path between the first antenna part and the second antenna part is formed.

19. The method of manufacturing an identification document of claim 18, wherein applying energy comprises selectively applying energy to the material to simultaneously form the conductive path and a desired pattern in the patch visible through the transparent window.

20. An identification document comprising an activated security feature, the activated security feature comprising:

a first antenna part and a second antenna part arranged such that a gap is formed between them;

a patch connected to the first antenna part and the second antenna part such that it bridges the gap, the patch being formed of a material having conductive properties which are changeable from low-conductive to high-conductive;

a conductive path formed in a portion of the material by selective laser irradiation of the material in a predetermined pattern; and an electrical device connected to at least one of the first antenna part or the second antenna part.

\* \* \* \* \*